UNITED STATES PATENT OFFICE.

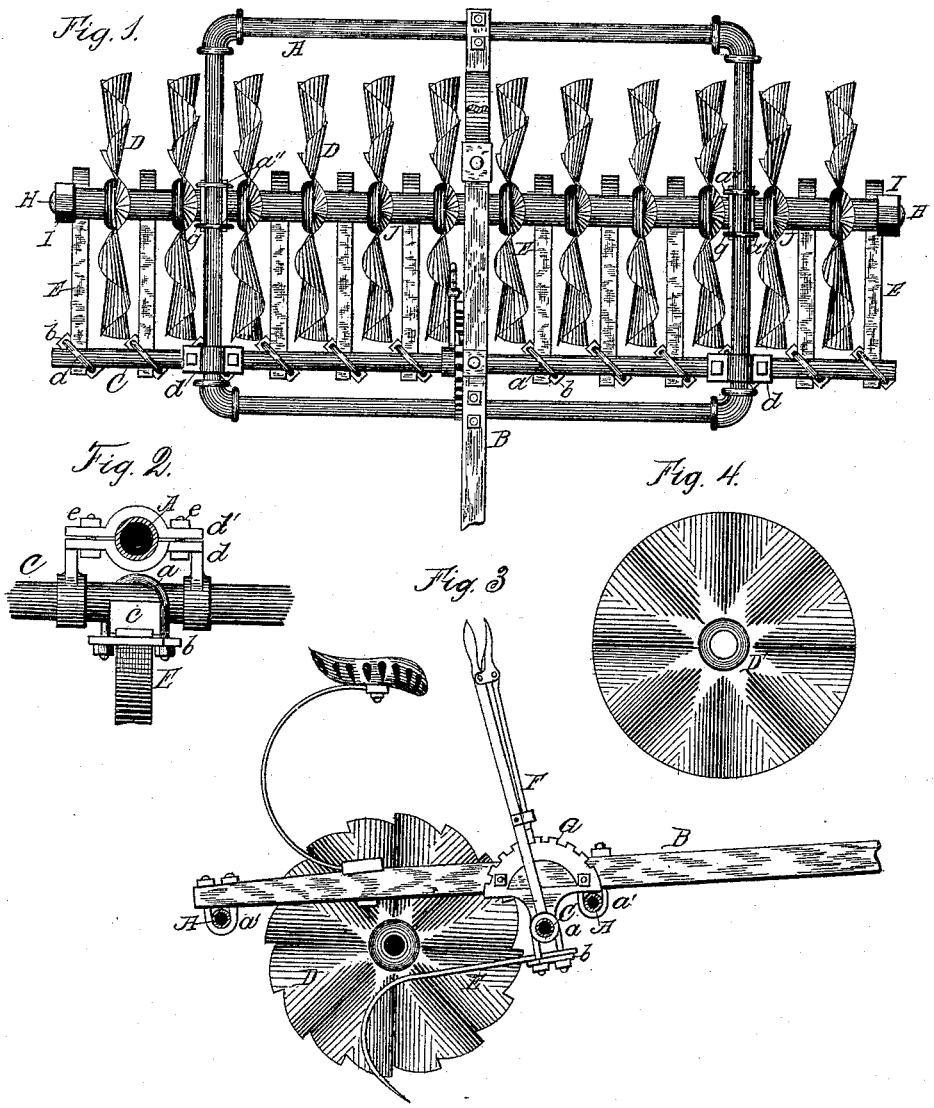

ADDISON A. STUART, OF CEDAR RAPIDS, IOWA.

HARROW.

SPECIFICATION forming part of Letters Patent No. 395,638, dated January 1, 1889.

Application filed June 5, 1888. Serial No. 276,090. (No model.)

*To all whom it may concern:*

Be it known that I, ADDISON A. STUART, a citizen of the United States, residing at Cedar Rapids, in the county of Linn and State of Iowa, have invented certain new and useful Improvements in Harrows; and I do hereby declare the following to be a full, clear, and exact description of the invention, such as will enable others skilled in the art to which it appertains to make and use the same.

The object of my invention is to improve a harrow by the combination in one machine of the distinctive features of the rotary and digging harrows.

The invention consists in the construction, combination, and arrangement of parts, as hereinafter fully set forth and claimed.

In the accompanying drawings, forming a part of this specification, Figure 1 is a plan view of a harrow embodying my invention, less the seat and draft apparatus; Fig. 2, a detail view showing the device for attaching the spring-tooth to its shaft and of the said shaft to its supporting-frame; Fig. 3, a longitudinal section of the harrow in the line $a\,b$ of Fig. 1; and Fig. 4, a plan view of a modified form of disk.

Similar letters of reference indicate corresponding parts.

Referring to the drawings, A is the main frame of the harrow, which in practice I make of gas-pipe, as shown, the effect of which is to render the frame very strong and light. Attached to this frame by suitable clips, $a'\,a'$, is the tongue B, and on this is mounted a seat in the usual way. Under this frame, and near the middle thereof, is placed the revolving part or the harrow, consisting of a series of disks, D D, mounted on a suitable axle, H, to which they are secured by means of intermediate thimbles, J J, drawn tightly against the opposite faces of the middle portion of the disks by the terminal nuts I I.

The axle of the harrow revolves in suitable boxes, $g\,g$, attached to the frame by clips $a''\,a''$. In practice the disks are made corrugated, as shown, the effect of which is to give them a comparatively wide tread, and to facilitate the cutting and pulverizing of the soil over which they travel. This latter effect is still further increased by serrating the periphery, as shown in Fig. 3. The disk may, however, be made with a plain periphery, as shown in Fig. 4. As will be seen by reference to the drawings, the corrugations terminate in a plane surface near the center of the disks, and as the disks revolve any soil accumulating on them is naturally forced toward the center and dislodged by the pressure from below. This tendency to clog is still further obviated by the constant vibrating action of the spring-teeth operating between the disks. To the frame in front of this series of disks is pivotally mounted a shaft or axle, C, to which is secured a hand-lever, F. The lever is retained in any desired position by a notched quadrant, G, in the usual way. Secured to this shaft, which in practice I make of pipe, for the reasons above mentioned, is a series of harrow-teeth, E E. In practice I make these teeth in substantially the form of the ordinary spring harrow-teeth, and attach them to their shaft by means of clips $a$ $a$, having suitable strap, $b$, together with interposed casting $c$, one side of which is concave to correspond with the curvature of the shaft, and the other is straight, or but slightly curved, and provided with a recess to retain the harrow-tooth E and prevent lateral movement of the same. These teeth ordinarily extend backward to about the line where the disks rest on the ground, and their relative depth in the soil may be regulated by turning their shaft by means of the hand-lever F. For working among roots, stones, and the like, it is desirable to set the teeth forward somewhat, and this is done by loosening the clips above specified. These teeth are placed midway between the disks, and they there perform the usual function of a harrow-tooth, to dig, while the office of the disks is to cut and pulverize, and also to hold down the soil while the teeth are being drawn through it. As, in the case of the construction shown in Fig. 1, two of these teeth are necessarily directly under the sides of the frame, the box in which their shaft is mounted needs to be of peculiar construction, and this, as shown in Fig. 2, consists, essentially, of the stirrup-shaped double box $d$, the upper portion of which forms the lower half of the yoke, which, with the upper half, $d$, connects the box with the frame A, as clamped together by the bolts *e e*. The effect of this arrangement of the disks and the digging-teeth is to combine in one machine the essential characteristics of the rotary and digging harrows, and in a peculiar manner secure advantages not possessed by either when used separately. This is due to the fact that the disks not only cut and pulverize the soil under them, but to a large extent, and particularly in the case of tough sod-ground, hold the sod down while the teeth are drawn through it. It is evident that the leveling action of a rotary harrow depends largely upon the mere matter of weight, and in the case of rough and tough sod this is ordinarily insufficient, while on the other hand the action of the ordinary toothed harrow tends to tear up and overturn comparatively large portions of the furrows; but by this construction, while the leveling action of the digging-teeth is utilized to the full extent, the disks, by holding down the adjacent soil, prevent any overturning of the same, except within the short space between them.

While the relative position of the harrow-teeth may be varied somewhat, as before stated, it will be understood that the change from a position in which the teeth operate directly below the axis of the disks will be but little in any case, the intention being to have the teeth and the disks operating in the same soil at the same time. In order that this may be done successfully at all times, I have found it necessary to corrugate the disks, not only for the reasons heretofore stated, but in order that the soil between the disks and adjacent to the teeth may be forced backwardly across said teeth, and be thus broken and pulverized. In the case of a plane disk the soil in some conditions would naturally accumulate between the disks, as retarded by the teeth, until, becoming completely clogged, they would cease to revolve. By corrugating the disks in the manner shown they are provided with a wide tread, whereby they are forced to revolve, and in revolving this corrugation of their sides or faces acts like a mill to grind the clods across the adjacent teeth.

Having thus described my invention, what I claim as new, and desire to secure by Letters Patent, is—

1. The combination, with a suitable frame, substantially as described, of a series of the herein-described corrugated disks mounted on an axle, and a series of harrow-teeth mounted to operate between said disks and in connection therewith, substantially as and for the purpose set forth.

2. In a harrow, the described disk having radial corrugations and a serrated periphery, substantially as and for the purpose set forth.

3. In a harrow, the combination, with the frame thereof, substantially as described, of a series of the herein-described corrugated disks mounted on a suitable axle, and a series of intermediate spring harrow-teeth, mounted at or near their forward ends to a rotating shaft in front of said disks, adapted to stir the soil between said disks, and a hand-lever adapted to turn said shaft a limited distance and thereby adjust the relative depth of said teeth in the soil, substantially as specified.

4. In a harrow, the combination, with a frame, substantially as described, of a series of revolving disks, a series of intermediate backwardly-extending spring-teeth, attached at their forward ends to a rotating shaft by means of clips *a a*, strap *b b*, and casting *c c*, and the yoke *d d*, the lower portion thereof forming the bearing for said shaft, substantially as described.

In testimony whereof I affix my signature in presence of two witnesses.

ADDISON A. STUART.

Witnesses:
S. W. BRAINERD,
J. M. MAY.